(12) United States Patent  
Ribo (10) Patent No.: US 8,396,180 B2  
(45) Date of Patent: Mar. 12, 2013

(54) HIGH JITTER TOLERANT PHASE COMPARATOR

(75) Inventor: Jerome J. Ribo, San Jose, CA (US)

(73) Assignee: Kawasaki Microelectronics America Inc., San Jose ( * ) Notice: Subject to any disclaimer, the term of this patent is extended or adjusted under 35 U.S.C. 154(b) by 1088 days.

(21) Appl. No.: 12/314,897

(22) Filed: Dec. 18, 2008

(65) Prior Publication Data

US 2010/0158180 A1    Jun. 24, 2010

(51) Int. Cl.
- H04L 7/00 (2006.01)
- H04B 7/02 (2006.01)
- H04W 4/00 (2009.01)

(52) U.S. Cl. .................. 375/371; 370/338; 375/267
(58) Field of Classification Search .......... 375/267, 375/371; 370/338
See application file for complete search history.

(56) References Cited

U.S. PATENT DOCUMENTS

| | | | |
|---|---|---|---|
| 6,459,745 B1 * | 10/2002 | Moose et al. | 375/355 |
| 6,993,084 B1 * | 1/2006 | Eberlein et al. | 375/260 |
| 7,020,116 B1 * | 3/2006 | Nakada | 370/338 |
| 2002/0009171 A1 | 1/2002 | Ribo | |
| 2002/0027957 A1 * | 3/2002 | Paulraj et al. | 375/267 |
| 2003/0031121 A1 * | 2/2003 | Sudo | 370/203 |
| 2003/0198105 A1 * | 10/2003 | Yamaguchi et al. | 365/200 |
| 2004/0091057 A1 * | 5/2004 | Yoshida | 375/260 |
| 2005/0228605 A1 | 10/2005 | Ribo | |
| 2005/0238126 A1 | 10/2005 | Ribo et al. | |
| 2006/0045224 A1 * | 3/2006 | Cranford et al. | 375/355 |
| 2006/0050626 A1 * | 3/2006 | Yucek et al. | 370/208 |
| 2006/0148414 A1 * | 7/2006 | Tee et al. | 455/69 |
| 2007/0053473 A1 * | 3/2007 | Palin | 375/355 |

* cited by examiner

*Primary Examiner* — David C. Payne  
*Assistant Examiner* — Sarah Hassan  
(74) *Attorney, Agent, or Firm* — Oliff & Berridge, PLC (57) ABSTRACT

Aspects of the disclosure provide a method and an apparatus for clock and data recovery. The method and apparatus can increase jitter tolerance, and can provide recovered data with reduced jitter amplitude. The method for recovering data transmitted over a channel can include detecting a phase of a data transition within a full unit interval that includes an active zone and an inactive zone that are set based on a jitter characteristic for the channel, generating a phase directive when the phase of the data transition is located within the active zone, and adjusting a data sampling phase based on the phase directive, so that the data transmitted over the channel is sampled at a data transition edge free location.

25 Claims, 11 Drawing Sheets

HIGH JITTER TOLERANT PHASE COMPARATOR

BACKGROUND

In communication, a transmitter may transmit data trough a communication channel to a receiver. The receiver may synchronize a clock signal to the transmitted data. Further, the receiver may determine a data edge free location based on the synchronized clock signal, and sample the transmitted data based on the data edge free location. However, it can be a challenge to determine the data edge free location when jitters, which are introduced by, for example various components of the communication channel and environment, are comparable to a data bit length.

SUMMARY

Aspects of the disclosure can provide a method and an apparatus for clock and data recovery. The method and apparatus can increase jitter tolerance, and can provide recovered data with reduced jitter amplitude.

The method for recovering data transmitted over a channel can include detecting a phase of a data transition within a full unit interval that includes an active zone and an inactive zone that are set based on a jitter characteristic for the channel, generating a phase directive when the phase of the data transition is located within the active zone, and adjusting a data sampling phase based on the phase directive, so that the data transmitted over the channel is sampled at a data transition edge free location.

To generate the phase directive, the method can include generating an up directive when the phase of the data transition is located within an up directive zone of the active zone, generating a down directive when the phase of the data transition is located within a down directive zone of the active zone. Accordingly, to adjust the data sampling phase based on the phase directive, the method can include shifting a phase of the sampling clock up when the up directive is generated, shifting a phase of the sampling clock down when the down directive is generated.

According to an aspect of the disclosure, to detect the phase of the data transition, the method can include generating a plurality of sampling pulses at different phases, and comparing the sampling pulses with the data transmitted on the channel to determine whether the phase of the data transition is located within an up directive or a down directive of the active zone.

In an embodiment, the method can include generating a first sampling clock for even bits and a second sampling clock for odd bits of the data transmitted over the channel, shifting the first and second sampling clocks at different phases to define respective up directive and down directive within the active zone for the even bits and the odd bits, and comparing the data sampled at the different phases of the sampling clocks to determine whether the phases of the data transition of the odd bits and the even bits are located within the respective up directive or the respective down directive of the active zone.

According to an aspect of the disclosure, the active zone can be less than 360 degrees of the full unit interval. Further, the active zone can be variable.

In addition, the method can include adaptively defining the active zone and the inactive zone based on detected phases of data transitions. Alternatively, the method can include adaptively setting a size of the active zone based on a jitter characteristic of the channel. The size of the active zone can be adjusted to accommodate an amount of jitter expected on the channel.

According to the disclosure, a clock data recovery (CDR) device can include a clock generator module configured to generate a clock signal for data sampling, a phase adjustor module configured to provide sampling signals based on the clock signal and a phase directive, a sampler module configured to sample a received data signal according to the sampling signals, and a reduced angle phase comparator unit configured to detect a phase of a data transition within a full unit interval that includes an active zone and an inactive zone that are set based on a jitter characteristic for the channel. The reduced angle phase comparator can be further configured to generate the phase directive and provide the phase directive to the phase adjustor if the phase is within the active zone.

Further, the CDR device can be used in a communication system. The communication system may include a transmitter configured to transmit a data signal, a communication channel having the jitter characteristic and being configured to transmit the data signal under the jitter characteristic and a receiver that can include the CDR device to recover data from the transmitted data signal.

BRIEF DESCRIPTION OF THE DRAWINGS

Various embodiments of this disclosure that are proposed as examples will be described in detail with reference to the following figures, wherein like numerals reference like elements, and wherein:

FIGS. 6(*a*)-(*c*) show circular diagrams illustrating exemplary comparator characteristics;

FIGS. 10(*a*) and 10(*b*) show a jitter tolerance comparison of a 180 degree comparator and a 45 degree comparator according to an automatic sinusoidal jitter tolerance characterization example.

DETAILED DESCRIPTION OF EMBODIMENTS

Figure 1:
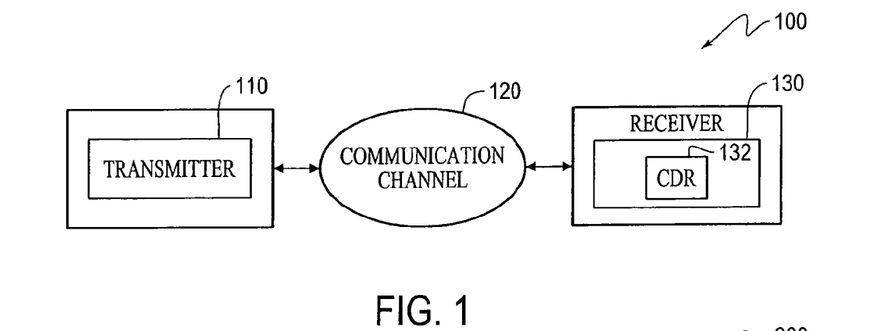
FIG. 1 shows a block diagram of an exemplary communication system.

FIG. 1 shows an exemplary block diagram of a communication system 100. The communication system 100 can include a transmitter 110 and a receiver 130 that are coupled together via a communication channel 120. The receiver 130 can be equipped with a clock and data recovery (CDR) 132. The communication system 100 may represent various telecommunication systems, computer systems, network systems, and the like.

In a communication system, such as a telecommunication system, the transmitter 110 may transmit data via the communication channel 120 without an accompanying clock, such as high-speed serial data streams. Of course, the communication channel 120 can include any type of links, wired, wireless, or any combination, that can allow for data transmission. For example, the communication channel 120 can include conventional telephone lines, digital transmission facilities, fiber optic lines, direct serial/parallel connections, cellular telephone links, RF and/or IR links, satellite communication links, any local area networking (LAN) technology, such as Ethernet, Intranets and the like.

The communication channel 120 may include characteristics that can introduced noise or distortion to data transmitted over the channel. For example, data drift conditions exist which result in the serial data streams drifting in phase during transmission. The noise or distortion of a particular communication channel can be calculated or otherwise previously known, and can be referred to as a jitter characteristic of the communication channel 120. Thus, during operation, the communication channel 120 may introduce jitters to data.

The receiver 130 can receive a data signal from the communication channel 120, and can recover a clock signal and the transmitted data based on the received data signal. For example, the CDR 132 of the receiver 130 can generate a clock from an approximate frequency reference, and align its phase to the received data signal with a phase-locked loop (PLL).

In order to account for the jitter characteristics of the communication channel 120, the CDR 132 can be configured to include an inactive zone. By including the inactive zone, the jitter characteristics of the communication channel 120 can be considered when sampling a data stream, and thus increase jitter tolerance of the receiver 130. Further, the inactive zone may be adjusted based on the jitter characteristics of the communication channel 120.

The operation of the communication system 100 can be described as the following. The transmitter 110 can transmit serial data streams. The serial data streams may be transmitted over the communication channel 120. The communication channel 120 may introduce jitters in the transmitted serial data streams. The transmitted serial data streams can be received by the receiver 130.

Once received, the CDR 132 can retrieve data bits from the received serial data streams without requiring a transmitted clock signal. The CDR 132 may generate a recovered clock based on the serial data streams, and the recovered clock can be used to recover data bits in the serial data streams. The CDR 132 can be configured to have an inactive zone for reducing jitter influence, and a reduced active zone for the clock and data recovery. Consequently, the CDR 132 can operate with increased jitter tolerance to recover the clock and the data, and the recovered clock and data may have reduced jitter.

Figure 2:
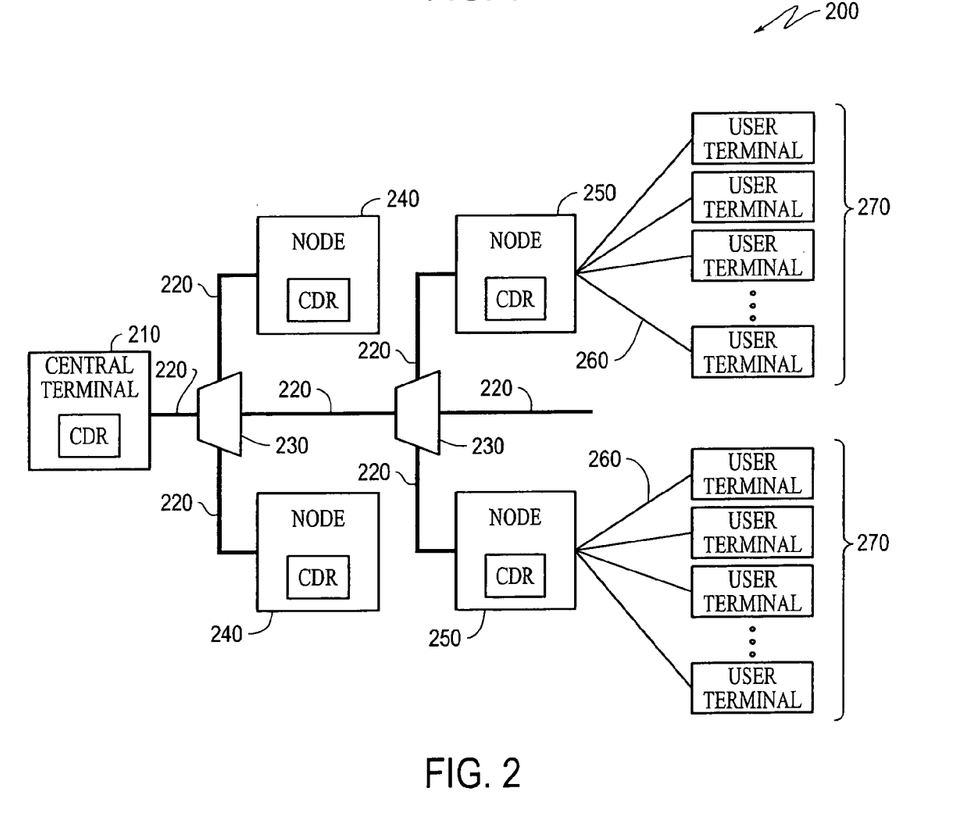
FIG. 2 shows a block diagram of an exemplary optical network system using clock data recovery (CDR)

FIG. 2 shows an optical network example according to an embodiment of the disclosure. The optical network 200 can include a central terminal 210, user terminals 270, and various wires and link connections that can form communication channels between the central terminal 210, and the user terminals 270 or nodes 240. For example, the communication channels may include splitters 230, a number of nodes 240, 250, and link connections 220 and wires 260. The central terminal 210 can be coupled with the splitters 230 via link connections 220. The splitters 230 can be subsequently coupled with the nodes 240, and 250 via link connections 220. The node 250 can be coupled with user terminals 270 via wires 260.

During operation, the central terminal 210 can broadcast downstream data. The downstream data may be transmitted to the nodes 240 and 250 via the splitters 230 and link connections 220. The splitter 230 splits link connections to make a single-to-multiple connection. The splitter 230 is typically a purely passive element, but can also integrate the function of a repeater, router, amplifier, and the like. According to an embodiment of the disclosure, the nodes 240 and 250 can include a CDR with a reduced angle phase comparator. The reduced angle phase comparator may have a reduced active zone to recover clock and data from the received downstream data. Subsequently, the nodes 250 can forward the recovered data to user terminals 270 via wires 260.

On the other hand, the user terminals 270 may transmit upstream data to the central terminal 210 via the communication channel. In another embodiment of the disclosure, the central terminal 210 can also include a CDR with a reduced angle phase comparator. The reduced angle phase comparator may have a reduced active zone to recover clock and data from the received upstream data.

In the aforementioned embodiments, the optical network 200 may be a passive optical network (PON), and the central terminal 210 can be an optical line terminal (OLT). The link connections 220 can be fiber optical cables. The splitters 230 can be unpowered optical splitters to enable a single optical fiber to serve multiple premises. The nodes 240 can be optical network terminations (ONT). The nodes 250 can be optical network units (ONU). The wires 260 can transmit data to/from the user terminals, and can be wired or wireless links. The user terminals 270 can be network terminations (NT).

The operation of the optical network 200 can be described as the following. The central terminal 210, such as OLT, can send downstream data via the link connections 220, such as fiber optical lines. The splitters 230 can receive the downstream data from the central terminal 210 via the link connections 220 and forward to another splitter 230. Subsequently, the another splitter 230 can send the downstream data to multiple nodes 240 and 250, such as ONTs and ONUs, over the links 260. Each of the nodes 240 and 250, such as ONTs and ONUs, can include a CDR with a reduced angle phase comparator. The reduced angle phase comparator can have a reduced angle active zone to recover clock and data from the received downstream data. The nodes 250 can forward the recovered data to multiple user terminals 270.

The central terminal 210 can receive upstream data from the nodes 240 and 250 via the link connections 220. The nodes 240 and 250 can share the bandwidth of the fiber optical line, for example using time division multiple access (TDMA) technology. TDMA allocates time slots of the bandwidth for each of the nodes.

Figure 3:
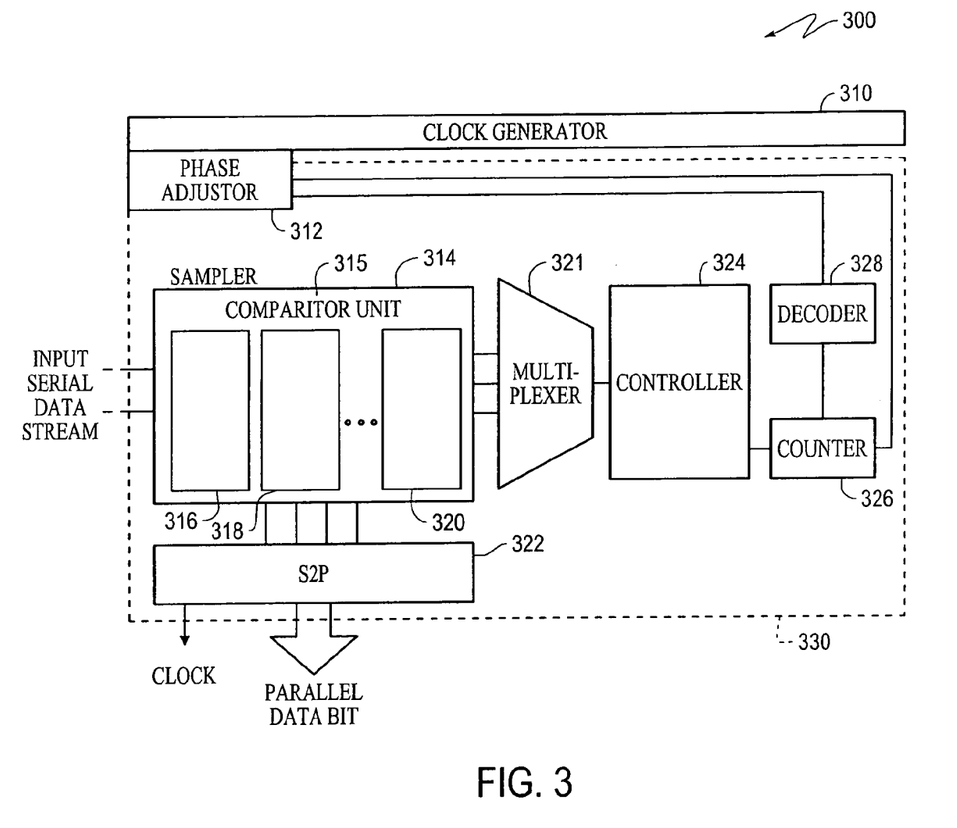
FIG. 3 shows a block diagram of an exemplary CDR device.

FIG. 3 shows a block diagram of an exemplary CDR device 300 according to the disclosure. The CDR device 300 can include a clock generator module 310, a phase adjustor module 312, and a CDR module 330. The clock generator module 310 can generate a clock signal, and provide the clock signal to the phase adjustor module 312. The phase adjustor module 312 can phase shift the clock signal to generate one or more sampling clocks. The CDR module 330 may sample a data signal, such as a serial differential pair signal, based on the sampling clocks, and may generate control signals based on the sampled data. The phase adjustor module 312 can receive the control signals from the CDR module 330 to adjust phase rotations of the sampling clocks.

The CDR module 330 can further include a sampler module 314, a multiplexer 321, a controller 324, a decoder 328, a counter 326 and a serial to parallel converter 322. The sampler module 314 can sample the data signal based on the sampling clocks generated by the phase adjustor module 312. The sampled data can be transmitted to the serial to parallel converter 324 for serial to parallel conversion.

According to an embodiment of the disclosure, the sampler module 314 can include a sampling unit (not shown) and a comparator unit 315 including a plurality of phase comparators 316, 318, and 320. During operation, one of the comparators 316, 318 and 320 can be selected based on the jitter characteristics of the communication channel, and provide output to adjust data sampling. In another embodiment (not shown in the figure), the sampler module 314 may include a sampling unit and a phase comparator 315, which can be an adaptive phase comparator.

The sampling unit may sample the input data, and the comparator unit 315 may generate directives based on the sampled data. For example, the sampling unit can sample the data according to multiple sampling clocks. The multiple sampled data can be used to determine data transitions. The comparator unit 315 can determine whether the data transitions are within an active zone by comparing the data transition phase and the active zone phase.

Subsequently, the comparator unit 315 can generate directive outputs, i.e., increment/decrement directives based on the comparator results. In the example, the comparator unit 315 may provide directive outputs from the plurality of phase comparators to the multiplexer 321. The multiplexer 321 may select a directive output based on knowledge of a communication channel jitter characteristic.

The selected directive output can be sent to the controller 324. The controller 324 can process the increment/decrement directives and generates the increment/decrement signals that adjust at the appropriate time a counter value of the counter 326. The decoder 328 can decode the counter value and generates control signals to phase shift the sampling clock.

According to an embodiment of the disclosure, the phase comparators 316, 318, and 320 can be configured to have different active zones, such as 360, 180, and 90 degrees. Therefore, the phase comparators 316, 318, and 320 may be selected based on jitter characteristics in the communication channel. For example, under a high jitter condition, a phase comparator with a smaller active zone, i.e. 180, 90 degrees, can be used to improve jitter tolerance.

Figure 4A:
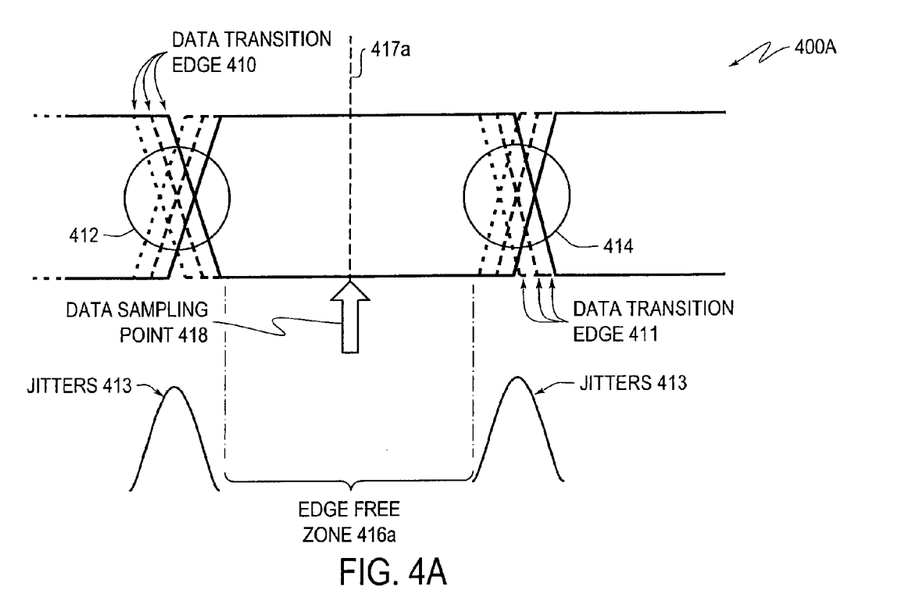
FIG. 4A-B shows exemplary plots illustrating data transitions under various jitter characteristics.
Figure 4B:
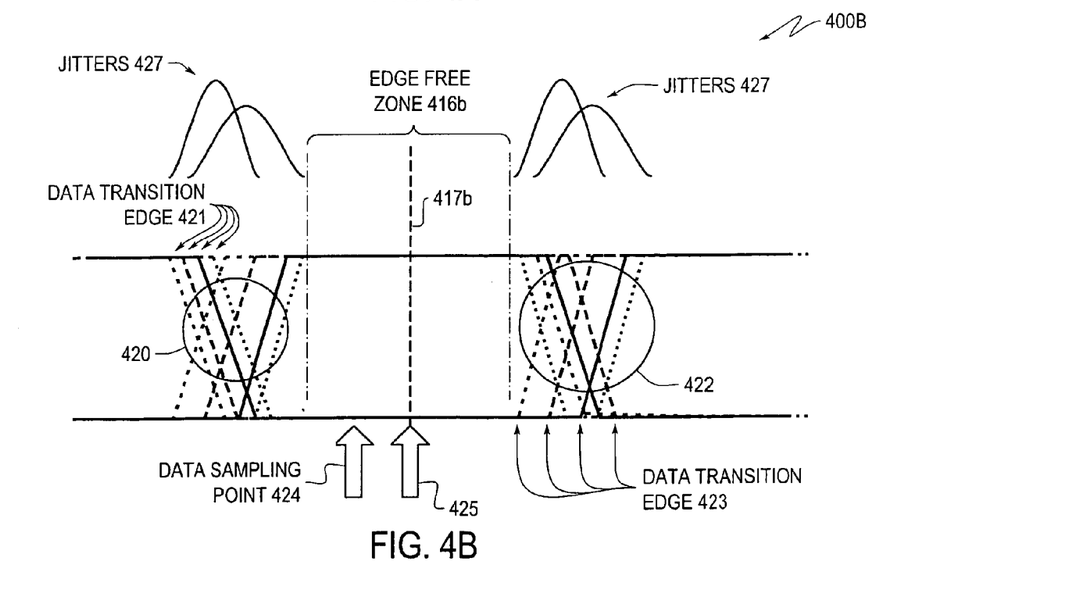

FIGS. 4(A) and 4(B) show examplary overlay plots of data transitions under various jitter characteristics within a full unit interval that can be used to transmit one bit of data. FIG. 4(A) shows a jitter characteristic with normal Gaussian distribution. FIG. 4(B) shows another jitter characteristic with a dissymmetric bi-modal distribution. The overlay plots 400A and 400B can include data transition edges 410, 411, 421, and 423, jitters 413 and 427, changes in data transition edges 412, 414, 420, and 422, edge free zones 416a and 416b, and data sampling points 418, 424, and 425. The data transition edge 410 and 421 are where bit patterns of an input serial data stream change from '1' to '0' (falling edge). The data transition edge 411 and 423 are where bit patterns of the input serial data stream change from '0' to '1' (rising edge). The jitter 413 represents a jitter distribution that substantially follows normal Gaussian distribution. The jitter 413 results in the changes in data transition edges 412 and 414 which is the same as 412. The jitter 427 represents a dissymmetric bi-modal jitter distribution. The jitter 427 results in the changes in data transition edges 420 and 422 which is the same as 420. These changes in data transition edges can indicate various data jitter conditions that can be caused by the jitter characteristics of the communication channel 120. Each of the edge free zones 416a and 416b can be a portion of a unit interval that is free of data transition edges. The data sampling points 418, 424, and 425 can indicate data sampling points for the data recovery. Generally, the middle of an edge free zone 417a and 417b can be preferred to recover the data as this is the location which offers a higher jitter tolerance.

The operation of a reduced angle phase comparator versus a conventional one in the context of FIG. 4 can be described as the following. A conventional phase comparator with range of operation 360 degrees collects data samples that are 180 degree apart, based on the average locations of the data edge transitions 410. When there is few changes in the locations of the data transition edges 412, 414 or distribution of jitters is normal Gaussian distribution as described in FIG. 4(A), this range of operation yield the data sampling point 418, near in the middle of an edge free zone 417a. In the scenario described in FIG. 4(A), the reduced angle phase comparator will lead to the same result: the boundary of an angle being adapted to the edge free zone 416a, and the data sampling point 418 being in the middle of the edge free zone 417a. However, when there are more changes in the locations of the data transition edges 420, 422 or the distribution of jitters is a dissymmetric bi-modal jitter distribution as illustrated in FIG. 4(B), the conventional comparator, which is based on averaging the locations of data transition edges, even if it averages an increased number of the data transition edges, will lock closer to the boundary of the jitter 427 due to the edges 421. This results in the data sampling point 424 that can be away from the middle of the edge free zone 417b. In the scenario described in FIG. 4(B), the reduced angle phase comparator can find the data sampling point 425 being in the middle of the edge free zone 417b.

According to the disclosure, the phase comparator can to collect data samples at a reduced angle (i.e., 180, 90, 45 degrees), thereby preventing the jitters 420, 422 from being transmitted to the comparator's output. Subsequently, it can minimize recovered clock jitter, and yield a data sampling point substantially in the middle of an edge free zone 417.

In an exemplary embodiment, a CDR can select from a number of reduced angle phase comparators with pre-defined ranges of operation angles based on jitter characteristics such as jitter size and shape. In another embodiment, a single adaptive phase comparator can adaptively determine its range of operation angles based on jitter characteristics for high jitter tolerance.

Figure 5:
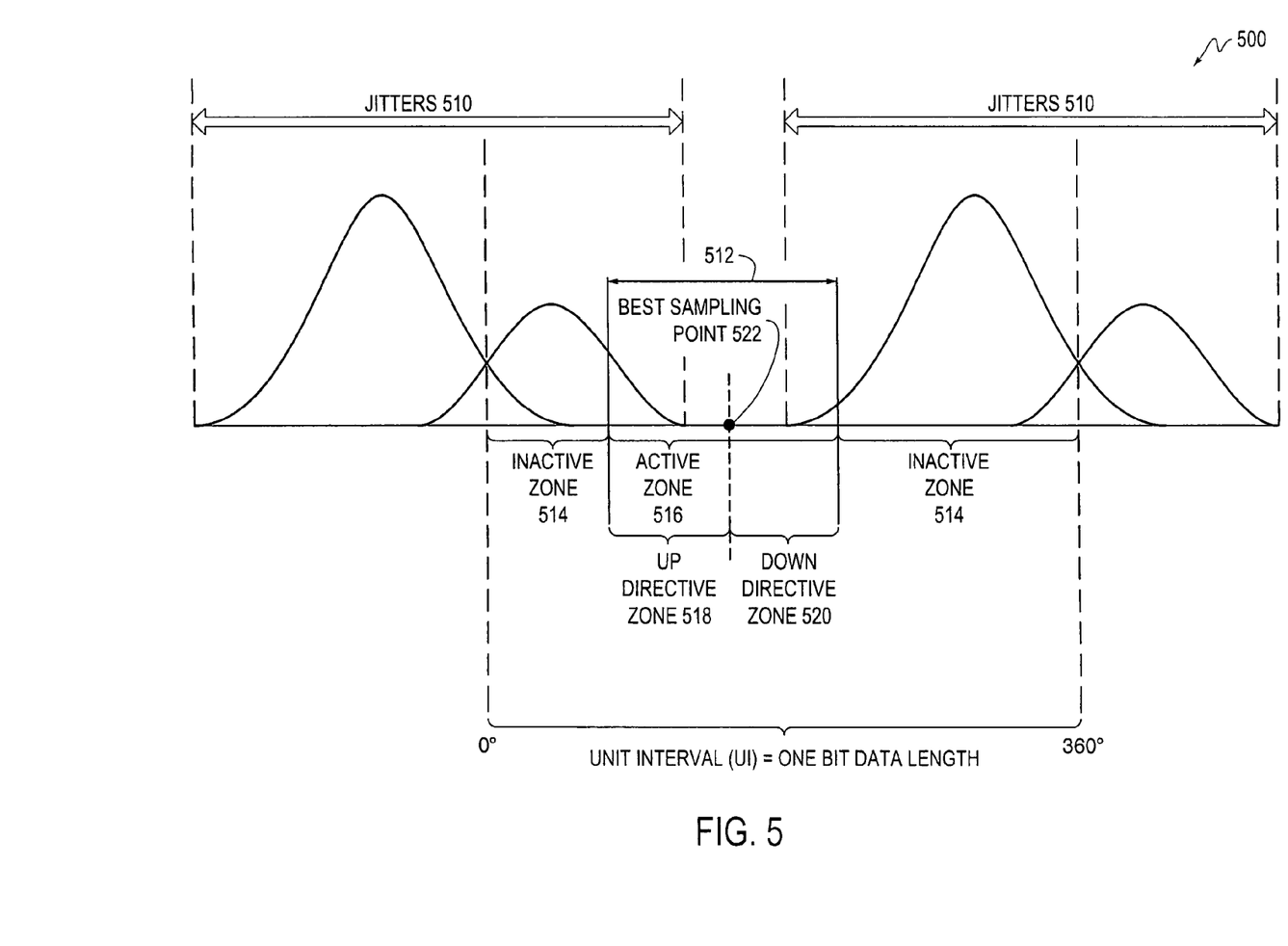
FIG. 5 shows an exemplary plot for a unit interval.

FIG. 5 shows a plot of a full unit interval (360 degrees). The unit interval (UI) 500 can include an inactive zone 514 and an active zone 516. Jitters 510 can be shown in FIG. 5. The jitters 510 describes jitter distributions with different jitter shapes and sizes. As described above, the jitters 510 represented in FIG. 5 can be a function of the jitter characteristics of the communication channel. A sampling phase can be adjusted within the active zone 516 for an edge free sampling point, such as the data sampling point 522. The active zone 516 can correspond to the range of operation angles for a reduced angle phase comparator. The active zone 516 can further include an up directive zone 518 and a down directive zone 520. The inactive zone 514 can be defined as a function of a communication channel jitter characteristic. For example, a large inactive zone can be defined for a communication channel having a jitter level larger than a threshold. The active zone 516 and the inactive zone 514 can also be adaptively defined, for example based on jitter knowledge of the communication channel.

During operation, for example, a phase comparator can be configured to have the active zone 516 including the up directive zone 518 and the down directive zone 520, and the inactive zone 514 according to FIG. 5. Then, the phase comparator may generate directives based on its configuration. For example, when a data transition phase is within the inactive zone 514, the phase comparator may not respond. When the data transition phase is within the up directive zone 518, the phase comparator may output an up directive to shift phases of sampling clocks up, and when the data transition phase is within the down directive zone 520, the phase comparator may output a down directive to shift the phases of the sampling clocks down.

Figure 6A:
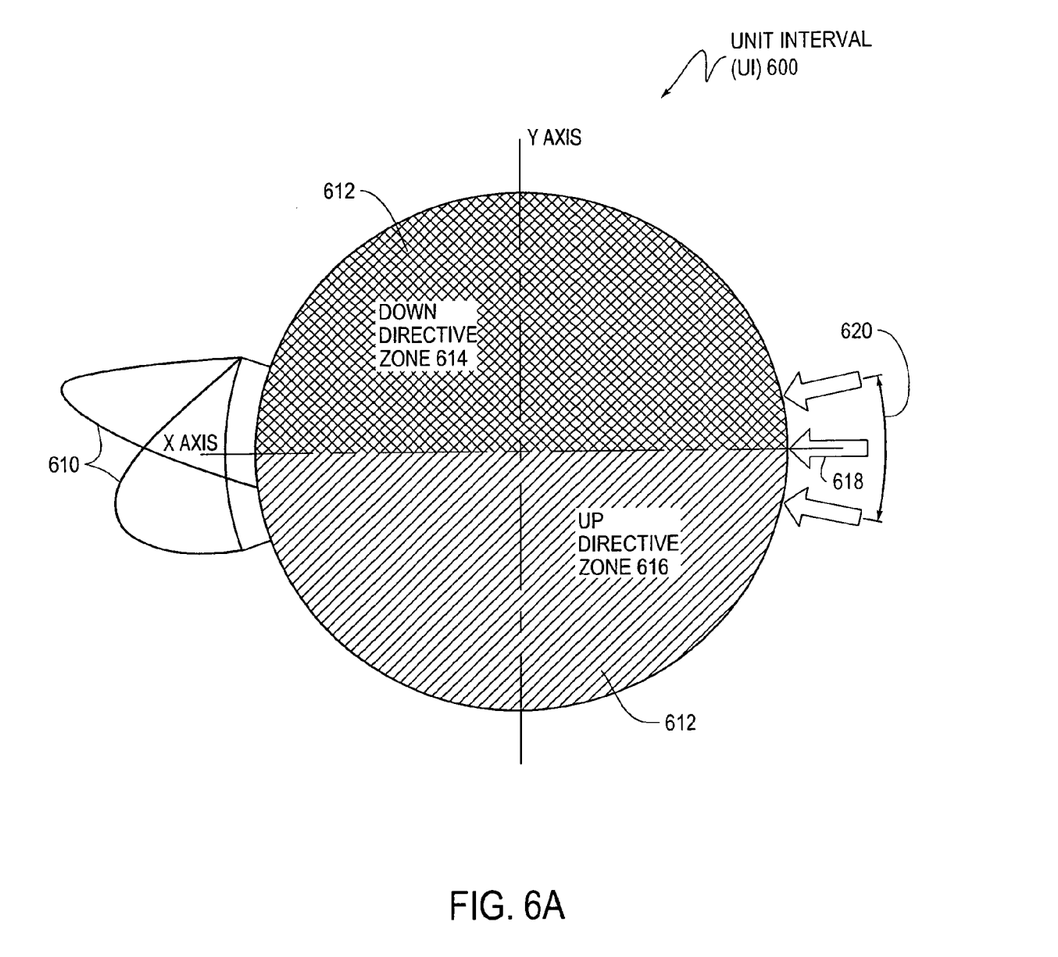
Figure 6B:
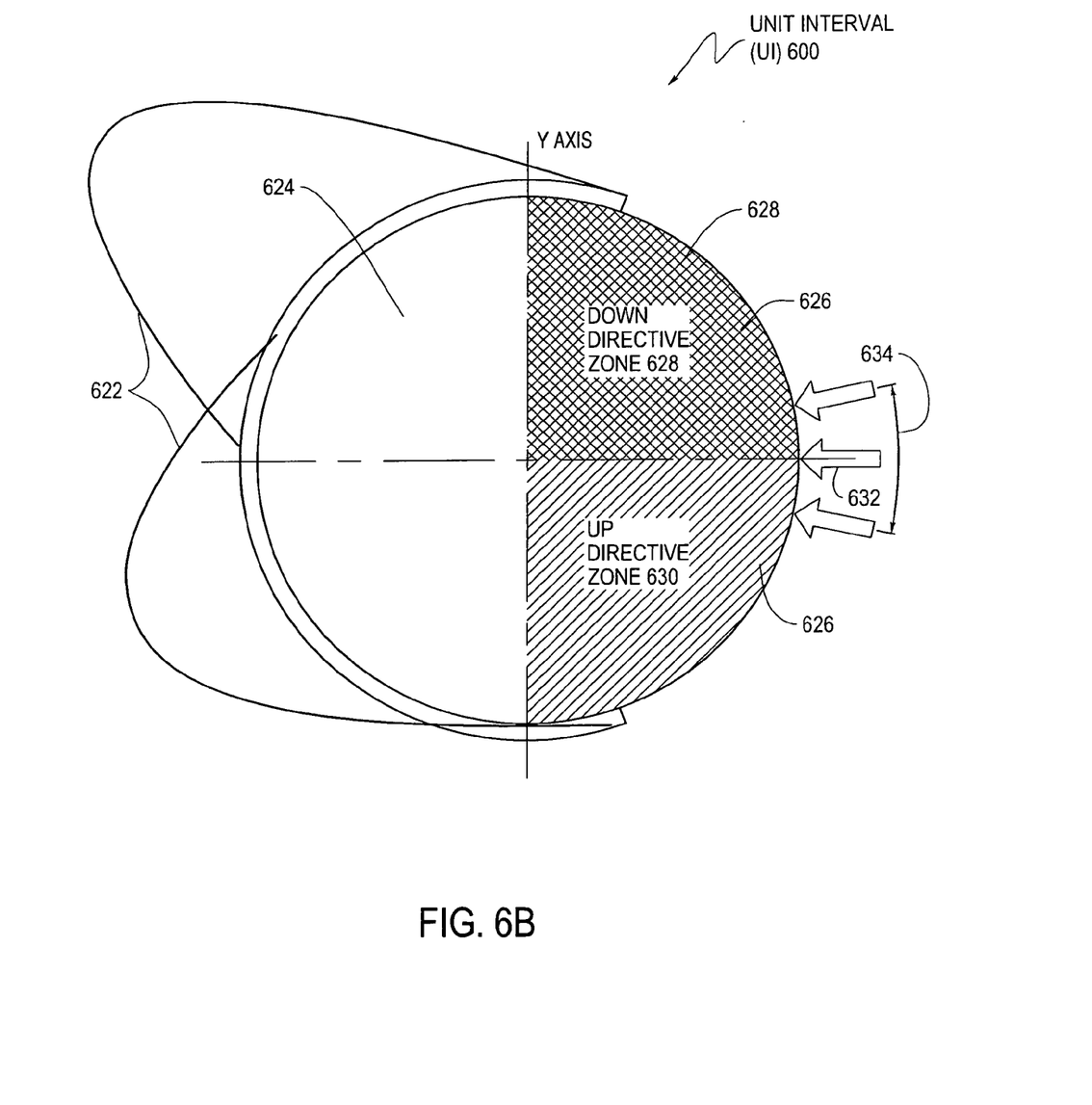
Figure 6C:
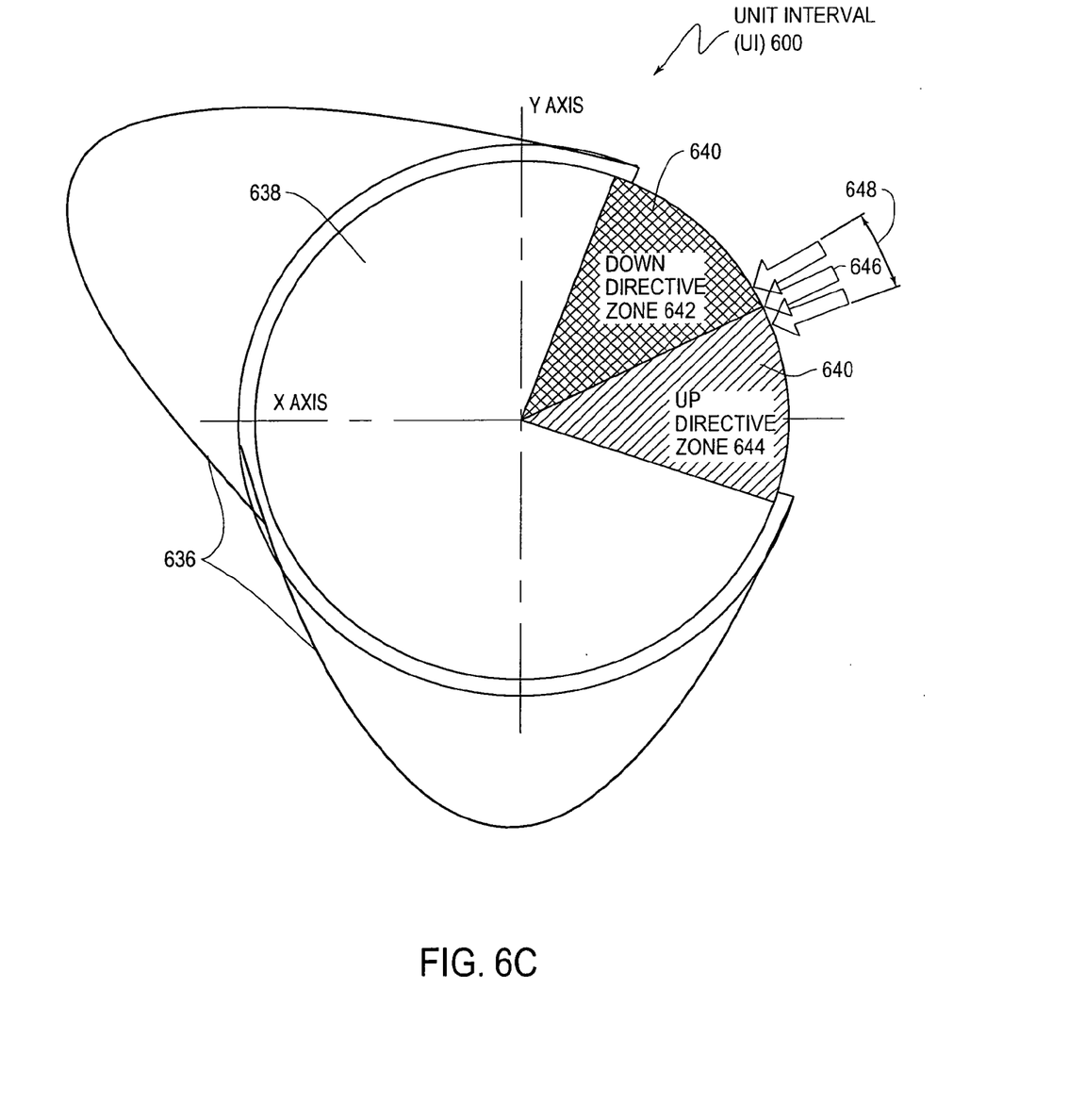

FIG. 5 can be mapped to a circular diagram representing a full range of a unit interval (UI). The circular diagram can allow define the inactive zone 514 and the active zone 516 within 360 degrees range of the unit interval. FIGS. 6(*a*), 6(*b*), and 6(*c*) represent such circular diagrams for various communication channel jitter characteristics.

FIG. 6(*a*) shows a circular diagram of an exemplary phase comparator characteristic. The phase comparator characteristic can include a 360 degree active zone 612. Thus, the phase comparator may operate at its full angle (360 degrees) of the UI without any inactive zone. The active zone 612 can further include a down directive zone 614 of 180 degrees with regard to a current sampling phase 618 and an up directive zone 616 of 180 degree with regard to the current sampling phase 618, for example.

In an embodiment, a phase comparator can be configured in the phase comparator characteristic shown in FIG. 6(*a*), when a communication channel has a small jitter level characteristic 610, such as less than 0.375 UI peak to peak jitter. During operation, the phase comparator may detect a location of data transition. When the location is within the up directive zone, the phase comparator may generate an up directive, and when the location is within the down directive zone, the phase comparator may generate a down directive. The up and down directives can be used to adjust a sampling clock 618. The adjustment of the sampling clock 618 can be shown as output clock jitters 620.

FIG. 6(*b*) shows a circular diagram of another exemplary phase comparator characteristic according to the disclosure. The phase comparator characteristic can include an inactive zone 624, and a reduced angle active zone 626. The reduced angle active zone 626 may further include a down directive zone 628 of 90 degrees with regard to a current sampling phase 632 and an up directive zone 630 of 90 degrees with regard to the current sampling phase 632, for example.

In an embodiment, a phase comparator can be configured in the phase comparator characteristic shown in FIG. 6(*b*), when a communication channel has a medium level jitter characteristic 622, such as between 0.375 UI and 0.625 UI of peak to peak jitters. During operation, the phase comparator may detect a location of data transition. When the location is within the inactive zone, the phase comparator may keep the sampling phase 632, and when the location is within the active zone, the phase comparator may generate a directive to shift the sampling phase 632. More specifically, when the location is within the up directive zone, the phase comparator may generate an up directive to shift the sampling phase 632 upwards, and when the location is within the down directive zone, the phase comparator may generate a down directive to shift the sampling phase 632 downwards, for example.

As can be seen, a majority part of the jitters 622 of any shape and size may be outside of the active zone 626 because of the increased range of the inactive zone 624 in comparison with FIG. 6(*a*). This can make the reduced angle phase comparator have an increased tolerance to jitters. Further, the reduced angle phase comparator may output the data sampling clock 632 with a reduced jitter 634 comparing to the jitter 622.

FIG. 6(*c*) shows a circular diagram of another phase comparator characteristic according to the disclosure. The phase comparator characteristic can include a further reduced angle active zone 640, and an inactive zone 638. The active zone 640 may further include a down directive zone 642 with 45 degrees with regard to a current sampling phase 646, and an up directive zone 644 with 45 degrees with regard to the current sampling phase 646, for example.

In an embodiment, a phase comparator can be configured in the phase characteristic shown in FIG. 6(*c*), when a communication channel have a high level jitter characteristic 636, such as above 0.625 UI of peak to peak jitters. During operation, the phase comparator may detect a location of data transition. When the location is within the inactive zone 638, the phase comparator may keep the sampling phase 646, and when the location is within the active zone, the phase comparator may generate a directive to shift the sampling phase 646. More specifically, when the location is within the up directive zone, the phase comparator may generate an up directive to shift the sampling phase 646 upwards, and when the location is within the down directive zone, the phase comparator may generate a down directive to shift the sampling phase 646 downwards, for example.

As can be seen, a large portion of the jitters 636 of any shape and size may be within the inactive zone 638. Thus, the reduced angle phase comparator can have an increased tolerance to jitters. Further, the reduced angle phase comparator may output the data sampling clock 632 with a reduced jitter 634 comparing to the jitter 622. In addition, FIG. 6(*c*) shows that the sampling clock 646 may be adjusted to shift from the center of the full unit interval to suit the asymmetric jitter characteristic 636.

Figure 7:
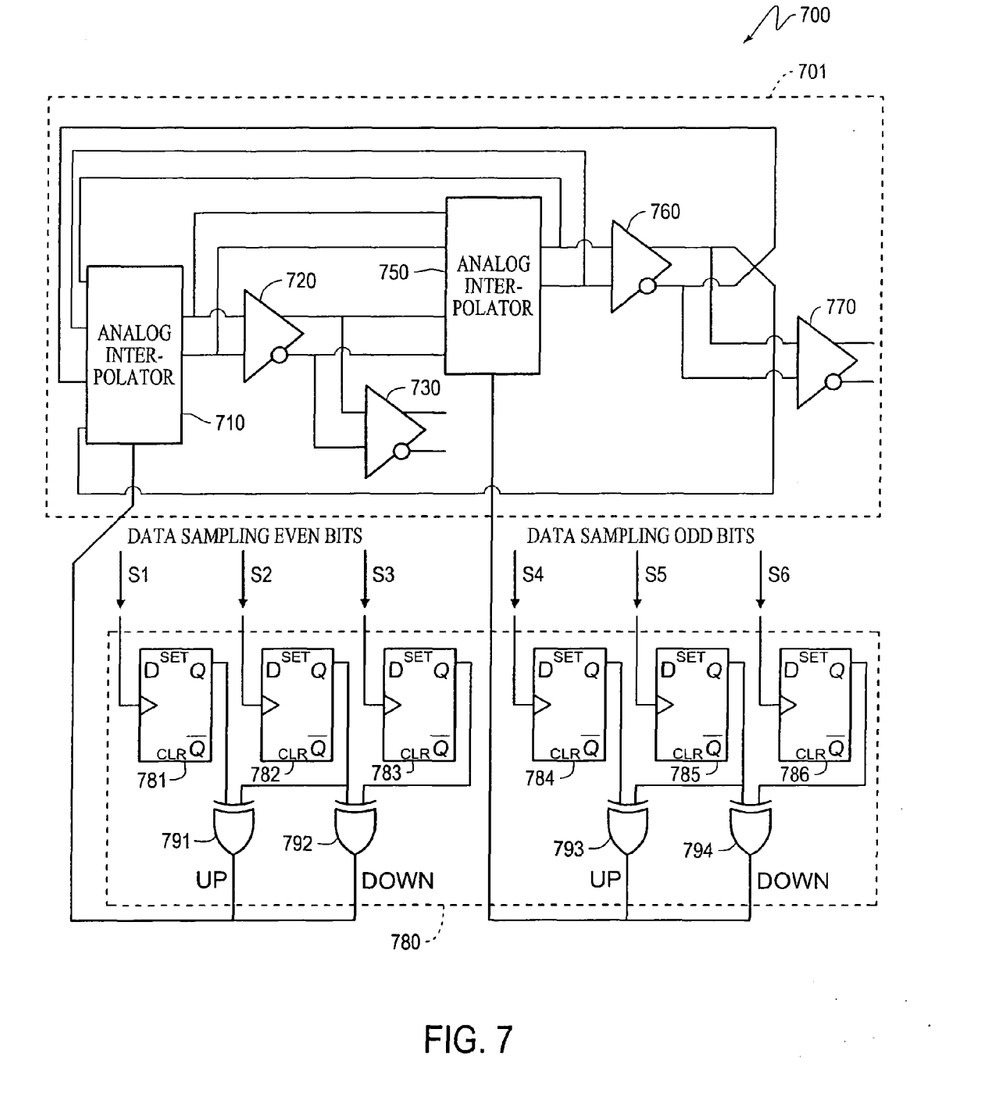
FIG. 7 shows a block diagram of another exemplary CDR device.

FIG. 7 shows a block diagram of another exemplary CDR device according to the disclosure. The CDR device 700 may include a half rate voltage control oscillator (VCO) 701, and a reduced angle comparator unit 780. The half rate VCO 701 can provide half rate sampling clocks for sampling even bits and odd bits of a data signal. The reduced angle comparator unit 780 can receive the half rate sampling clocks, and sample the data signal based on the half rate sampling clocks. Further, the reduced angle comparator unit 780 can compare phases of the sampled data with a reduced active zone angle, and can provide a directive to the half rate VCO 701 to adjust the half rate sampling clocks accordingly. The half rate VCO 701 and the reduced angle comparator unit 780 can be coupled together as shown in FIG. 7.

According to an embodiment of the disclosure, the half rate VCO 701 may include a two-stage ring oscillator and extra delay elements. The two-stage ring oscillator can include a first analog interpolator 710, a second analog interpolator 750, a first variable delay differential circuit 720 and a second variable delay differential circuit 760. The extra delay elements can include a third variable delay differential circuit 730, matching the delay of the first variable delay differential circuit 720, and a fourth variable delay differential circuit 770, matching the delay of the second variable delay differential circuit 760, according to an embodiment of the disclosure. Theses elements can be coupled as shown in FIG. 7.

In the two-stage ring oscillator, the first variable delay differential circuit 720 and the second variable delay differential circuit 760 can be cross coupled to form a two-stage ring oscillator structure. The first analog interpolator 710, and the second analog interpolator 750 can provide appropriate additional phases in the two-stag oscillator ring structure to ensure phase locking. The two-stage ring oscillator may provide multiple sampling clocks, such as S1, S2, S4 and S5. Two of the sampling clocks, such as S2 and S5, may be used to sample the even bits and the odd bits of the data signal.

The extra delay elements, such as the third variable delay differential circuit 730 and the fourth variable delay differential circuit 770, may provide additional sampling clocks, such as S3 and S6, with phase shifts to sampling clocks S2 and S5 for sampling the even bits and the odd bits.

In an embodiment, the extra delay elements can be configured to generate fixed delays, such as 90 degrees, to the data sampling clocks, respectively. For example, the third variable delay differential circuit 730 and the fourth variable delay differential circuit 770 can be adjusted to shift 90 degrees with regard to the sampling clocks S2 and S5, respectively.

In another embodiment, the first to fourth variable delay differential circuits 720, 730, 760 and 770 can be adjusted, for example with regard to the jitter characteristics of the communication channel. The adjustments of the variable delay differential circuits 720, 730, 760, and 770 may vary phase intervals between the sampling clocks. For example, the adjustments of the variable delay differential circuit 730 may vary the phase interval between the sampling clocks S2 and S3, and the adjustments of the variable delay differential circuit 770 may vary the phase interval between the sampling clocks S5 and S6. In addition, these variable delay differential circuits may be independently adjusted to compensate for mismatches, such as even bits and odd bits timing mismatches, in the communication channel.

The reduced angle comparator unit 780 may receive the sampling clocks, such as S1-S6, from the half rate VCO 701. Further, the reduced angle comparator unit 780 may use the sampling clocks to sample the data signal. Additionally, the reduced angle comparator unit 780 may compare a phase of a data transition determined based on the sample data, to phases of an inactive zone, and an active zone, and may generate a directive if the phase of the data transition is within the active zone. The directive can be feed back to the half rate VCO 701 to adjust the sampling clocks.

In the example of FIG. 7, the reduced angle comparator unit 780 may include six sampling units, such as D flip-flops 781-786. The six sampling units 781-786 may sample the data signals using the six sampling clocks S1-S6, respectively. For example, the D flip-flop 781 may receive the data signal at its data input terminal D, and receive the sampling clock S1 at its clock input terminal, and output the sampled data at its positive output terminal Q.

Further, the reduced angle comparator unit 780 may include comparators, such as XOR gates 791-794, to determine whether a data transition is within the active zone or the inactive zone, and can generate a directive when the data transition is within the active zone. More specifically, the reduced angle comparator unit 780 may generate an up directive if the data transition is within an up directive zone of the active zone, and may generate a down directive if the data transition is within a down directive zone of the active zone.

In the example in FIG. 7, the active zone for the even bits can be defined by the phase interval between the sampling clocks S1 and S3, the active zone for the odd bits can be defined by the phase interval between the sampling clocks S4 and S6, and the inactive zones can be defined as zones outside of the active zones in a full unit interval. Further in the example, the up directive zone for the even bits can be defined by the phase interval between the sampling clocks S1 and S2, and the down directive zone for the even bits can be defined by the phase interval between the sampling clocks S2 and S3. Similarly, the up directive zone for the odd bits can be defined by the phase interval between the sampling clocks S4 and S5, and the down directive zone for the odd bits can be defined by the phase interval between the sampling clocks S4 and S5.

During operation, for example, when a data transition is within the up directive zone for the even bits, which is defined by the interval between the sampling clocks S1 and S2, the XOR gate 791 can output an up directive "1". The up directive "1" can be feedback to the VCO 701, such as the analog interpolator 710, to up shift the phase of the sampling clocks for the even bits. When a data transition is within the down directive zone for the even bits, which is defined by the interval between the sampling clocks S2 and S3, the XOR gate 792 can output a down directive "1". The down directive "1" can be feedback to the VCO 701, such as the analog interpolator 710, to down shift the phase of the sampling clocks for the even bits.

Similarly, when a data transition is within the up directive zone for the odd bits, which is defined by the interval between the sampling clocks S4 and S5, the XOR gate 793 can output an up directive "1". The up directive "1" can be feedback to the VCO 701, such as the analog interpolator 750, to up shift the phase of the sampling clocks for the odd bits. When a data transition is within the down directive zone for the odd bits, which is defined by the interval between the sampling clocks S5 and S6, the XOR gate 794 can output a down directive "1". The down directive "1" can be feedback to the VCO 701, such as the analog interpolator 750, to down shift the phase of the sampling clocks for the even bits.

According to an aspect of the disclosure, delays of the variable delay differential circuits in the FIG. 7 may be adjusted adaptively, for example based on a measure of the jitter characteristics in the communication channel. Thus, the up directive zones and the down directive zones can be adjusted adaptively. For example, to adapt the active zone to the jitter characteristic, it is desirable to maintain rates of the up/down directives at a low value. When there is no update on the up/down directives, it means that the active zone may be too small. On the other hand, a high rate of the up/down directives means that the active zone may be too large.

It is noted that the CDR device 700 may be implemented based any suitable technology. In an embodiment, the CDR device 700 may be implemented in a fully analog fashion, for example the reduced angle comparator 780 may be implanted with current mode logic (CML) gates. In another embodiment, the CDR device 700 may be implemented as a combination of analog and digital circuits.

Figure 8:
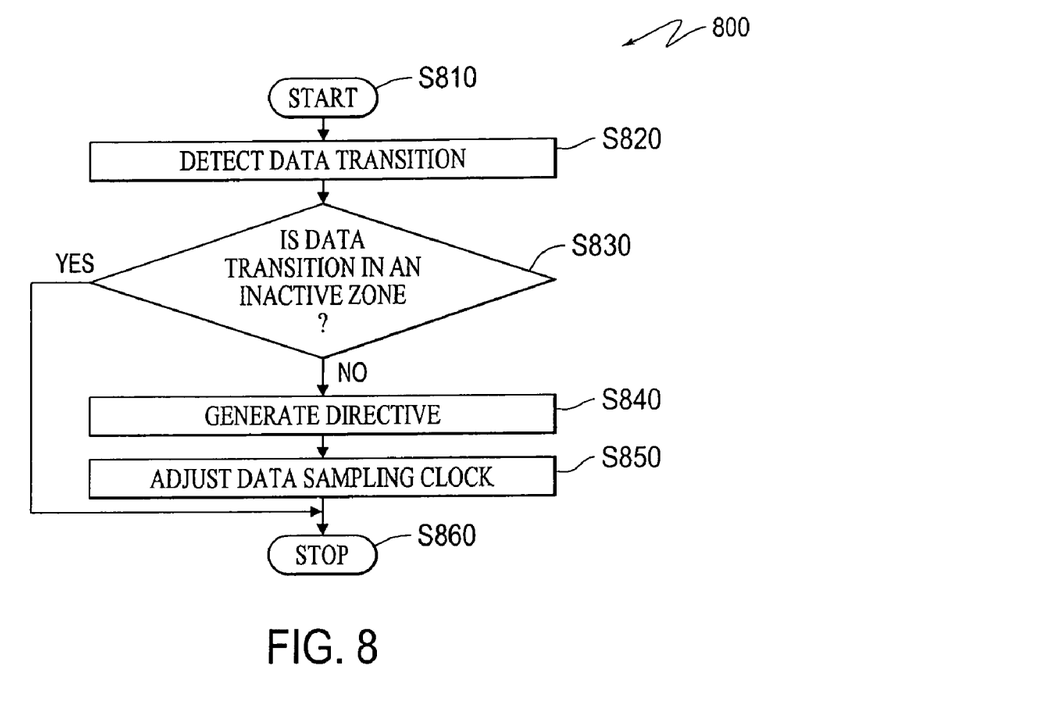
FIG. 8 shows a flow chart outlining an exemplary process for a CDR device to adjust a sampling clock for sampling transmitted data.

FIG. 8 shows a flow chart outlining an exemplary process for a CDR device to adjust a sampling clock for sampling transmitted data. The process starts at step S810, and proceeds to step S820.

In step S820, the CDR device may detect a data transition. For example, the CDR device may include a clock generator to generate a reference clock that is phase locked to the transmitted data. Further, the CDR device may include a phase adjustor that can generate multiple sampling clocks with phase shifts based on the reference clock. The multiple sampling clocks can be used to obtain multiple data samples in a full unit interval. Further, the multiple data samples can be used to detect a location of a data transition. Then, the process proceeds to step S830.

In step S830, the CDR device may determine whether the location of the data transition is within an inactive zone or an active zone. According to the disclosure, a full unit interval may include an inactive zone and an active zone that can be defined based on jitter characteristics of a communication channel. The inactive zone can be defined to provide increased jitter tolerance. When the data transition is with the inactive zone, the CDR device may do nothing, thus the process proceeds to step S860, and terminates; otherwise, the process proceeds to step S840.

In step S840, the CDR device may generate a directive based on the location of the data transition in the active zone. For example, the CDR device may generate an up directive when the data transition is located in an up directive zone within the active zone, and may generate a down directive when the data transition is located in a down directive zone within the active zone. Then, the process proceeds to step S850.

In step S850, the CDR device may adjust the data sampling clocks based on the directive. For example, the CDR device may shift the phase of the data sampling clocks upwards if an up directive has been generated, and may shift the phase of the data sampling clocks downwards if a down directive has been generated. Then, the process proceeds to step S860, and terminates.

Figure 9:
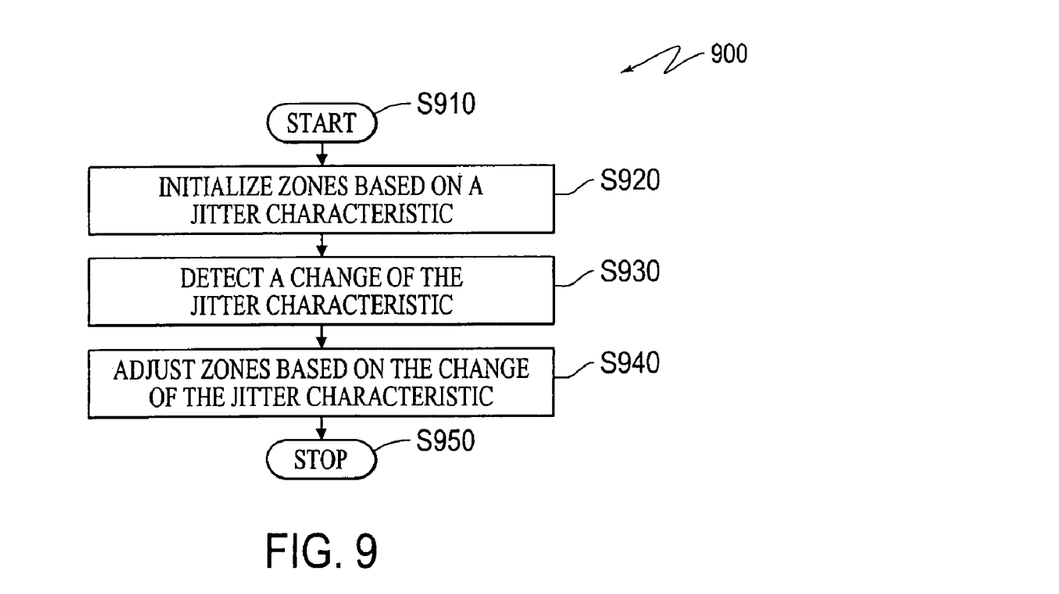
FIG. 9 shows a flow chart outlining an exemplary process for a CDR device to adaptively adjust an inactive zone and an active zone.

FIG. 9 shows a flow chart outlining an exemplary process for a CDR device to adaptively adjust an inactive zone and an active zone. The process starts at step S910, and proceeds to step S920.

In step S920, the CDR device may initially define an inactive zone and an active zone. In an example, the CDR device may initialize the inactive zone and the active zone based on previous knowledge of jitter characteristics in a communication channel. In an embodiment, the CDR device may include multiple comparators, each comparator may have a fixed setting of an inactive zone and an active zone. The CDR device may select a comparator based on the previous knowledge of the jitter characteristics. In another embodiment, the CDR device may include an analog VCO. The analog VCO may have adjustable parameters for defining the inactive zone and the active zone. The CDR device may initially adjust the parameters to an initial setting to define the inactive zone and the active zone. Then, the process proceeds to step S930.

In step S930, the CDR device may detect a change of the jitter characteristics in the communication channel. In an embodiment, the CDR device may detect data transitions, and may detect the change of the jitter characteristics based on the frequency of directives update. In another embodiment, the CDR device may receive information from other devices to detect the change of jitter characteristics. Then, the process proceeds to step S940.

In step S940, the CDR device may adjust the active zone and the inactive zone based the change of jitter characteristics. In an embodiment, the CDR device may select another comparator with a different setting of the active zone and the inactive zone. In another embodiment, the CDR device may adjust the parameters of the analog VCO to adjust the inactive zone and the active zone. Then, the process proceeds to step S950, and terminates.

It is noted that the above process may be repeated to adaptively adjust the inactive zone and the active zone based on the knowledge of the jitter characteristics.

Figure 10A:
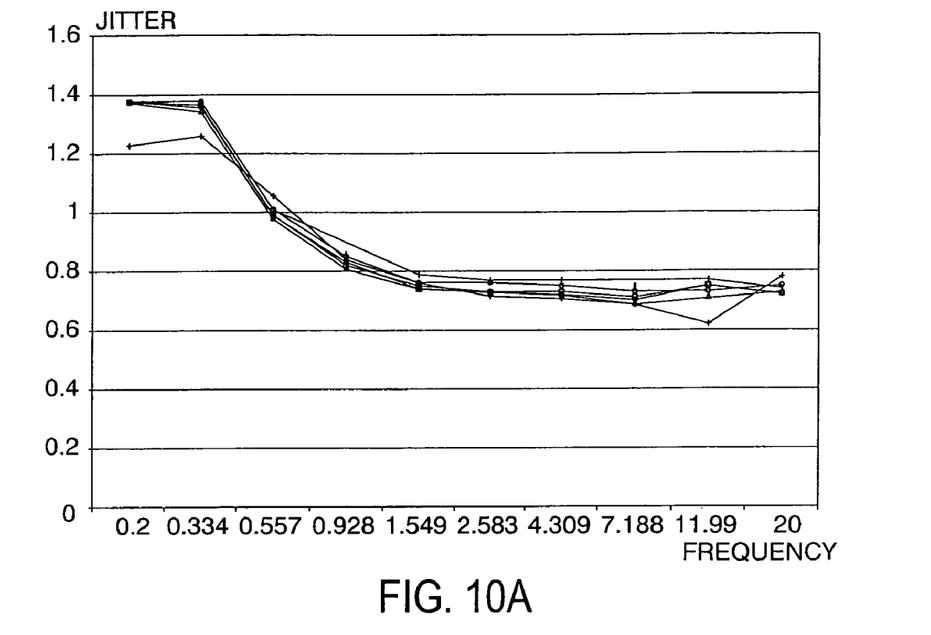
Figure 10B:
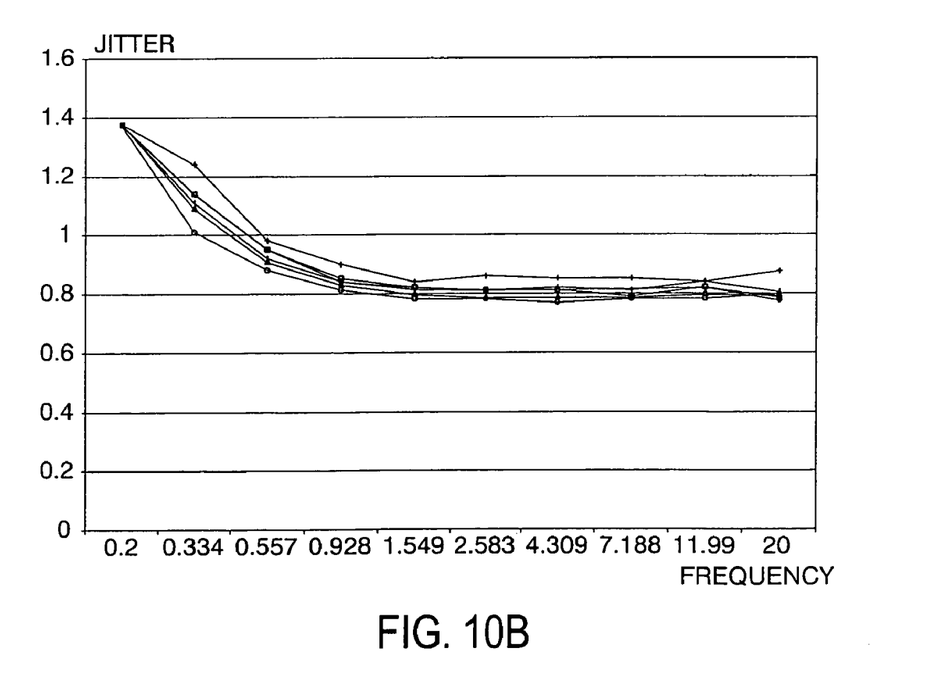

FIGS. 10A and 10B show a jitter tolerance comparison of a 180 degree comparator and a 45 degree comparator according to an automatic sinusoidal jitter tolerance characterization. During the characterization, measurements equipments can provide sinusoidal jitter varying in frequency scale and amplitude scale. The jitter limit for error free recovery can be shown in the FIGS. 10A and 10B. As can be seen, while the 180 degree comparator has a 0.6 UI jitter tolerance for high frequency jitter, the 45 degree comparator can have a 0.8 UI jitter tolerance, which is 0.2 UI jitter tolerance improvement.

Figure 11:
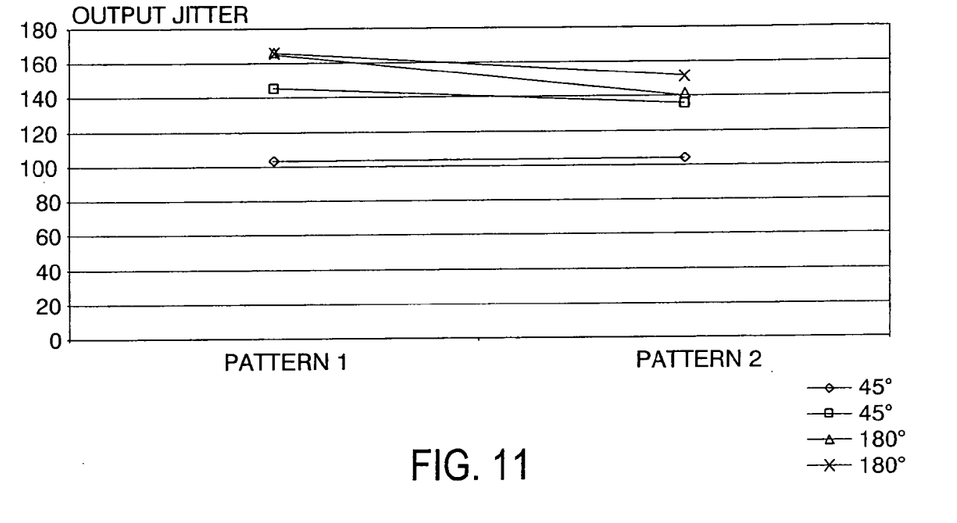
FIG. 11 shows a recovered data jitter comparison of a 180 degree comparator and a 45 degree comparator according to a measurement example of a transceiver.

FIG. 11 shows a recovered data jitter comparison of a 180 degree comparator and a 45 degree comparator according to a measurement of a transceiver. The transceiver can receive data transmitted over a communication channel, recover the transmitted data based on the 180 degree comparator or the 45 degree comparator, and transmit the recovered data. Jitter of the recovered data can be measured. As can be seen from FIG. 11, the jitter of the recovered data for the 45 degree comparator is reduced compared to the jitter of the recovered data for the 180 degree comparator.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A method for recovering data transmitted over a channel, comprising:

detecting a phase of a data transition within a full unit interval that is divided into an active zone including a phase of a sampling clock and an inactive zone outside of the active zone;

generating a phase directive when the phase of the data transition is located within the active zone but not generating a phase directive when the phase of the data transition is located within the inactive zone; and adjusting the phase of the sampling clock based on the phase directive, so that the data transmitted over the channel is sampled at a data transition edge free location.

2. The method according to claim 1, wherein generating the phase directive further comprises:

generating an up directive when the phase of the data transition is located within an up directive zone of the active zone; and generating a down directive when the phase of the data transition is located within a down directive zone of the active zone.

3. The method according to claim 2, wherein adjusting the phase of the sampling clock based on the phase directive further comprises:

shifting the phase of the sampling clock up when the up directive is generated; and shifting the phase of the sampling clock down when the down directive is generated.

4. The method according to claim 2, wherein detecting the phase of the data transition further comprises:

generating a first and a second additional sampling clock such that the up directive zone is defined by an interval between a phase of the first additional sampling clock and the phase of the sampling clock and the down directive zone is defined by the an interval between the phase of the sampling clock and a phase of the second additional sampling clock; and the data transmitted on the channel using the sampling clock and the first and second additional sampling clocks to determine whether the phase of the data transition is located within an up directive zone or a down directive zone of the active zone.

5. The method according to claim 1, wherein detecting the phase of the data transition further comprises generating a first sampling clock for sampling even bits and a second sampling clock for sampling odd bits of the data transmitted over the channel.

6. The method according to claim 1, wherein the active zone is less than 360 degrees of the full unit interval.

7. The method according to claim 6, wherein the active zone is variable.

8. The method according to claim 1, wherein the active zone is less than 180 degrees of the full unit interval.

9. The method according to claim 1, wherein the active zone is less than 90 degrees of the full unit interval.

10. The method according to claim 1, further comprising:
adaptively defining the active zone and the inactive zone based on detected phases of data transitions.

11. The method according to claim 1, further comprising:
adaptively setting a size of the active zone based on a jitter characteristic of the channel, wherein the size of the active zone is adjusted to accommodate an amount of jitter expected on the channel.

12. The method according to claim 11, wherein the size of the active zone is set to at least one of 360 degrees, 180 degrees and 90 degrees of the full unit interval.

13. A clock data recovery (CDR) device, comprising:
a clock generator module configured to generate a clock signal for data sampling;
a phase adjustor module configured to provide a sampling clock based on the clock signal and a phase directive;
a sampler module configured to sample a received data signal according to the sampling clock; and
a reduced angle phase comparator unit configured to detect a phase of a data transition within a full unit interval that is divided in an active zone including a phase of the sampling clock and an inactive zone outside of the active zone, the reduced angle phase comparator being further configured to generate the phase directive and provide the phase directive to the phase adjustor module when the phase of the data transition is within the active zone but not to generate the phase directive when the phase of the data transition is located within the inactive zone.

14. The CDR according to claim 13, wherein the reduced angle phase comparator unit is further configured to generate an up directive when the phase of the data transition is located within an up directive zone of the active zone, and generate a down directive when the phase of the data transition is located within a down directive zone of the active zone.

15. The CDR according to claim 14, wherein the phase adjustor module is further configured to shift the phase of the sampling clock up when the up directive is generated, and shift the phase of the sampling clock down when the down directive is generated.

16. The CDR according to claim 14, wherein:
the phase adjustor module is further configured to generate a first and a second additional sampling clock such that the up directive zone is defined by an interval between a phase of the first additional sampling clock and the phase of the sampling clock and the down directive zone is defined by an interval between the phase of the sampling clock and a phase of the second additional sampling clock; and
the reduced angle phase comparator unit is further configured to sample the data transmitted on the channel using the sampling clock and the first and second additional sampling clocks to determine whether the phase of the data transition is located within an up directive zone or a down directive zone of the active zone.

17. The CDR according to claim 13, wherein the phase adjustor module is further configured to generate a first sampling clock for sampling even bits and a second sampling clock for sampling odd bits of the data transmitted over the channel.

18. The CDR according to claim 13, wherein the active zone is less than 360 degrees of the full unit interval.

19. The CDR according to claim 13, wherein the active zone is variable.

20. The CDR according to claim 13, wherein the active zone is less than 180 degrees of the full unit interval.

21. The CDR according to claim 13, wherein the active zone is less than 90 degrees of the full unit interval.

22. The CDR according to claim 13, wherein the reduced angle phase comparator unit is further configured to adaptively define the active zone and the inactive zone based on detected phases of data transitions.

23. The CDR according to claim 13, wherein the reduced angle phase comparator unit is further configured to adaptively set a size of the active zone based on a jitter characteristic of the channel, wherein the size of the active zone is adjusted to accommodate an amount of jitter expected on the channel.

24. The CDR according to claim 13, wherein the reduced angle phase comparator unit includes a plurality of comparators having active zones being respectively set to at least one of 360 degrees, 180 degrees and 90 degrees of the full unit interval.

25. A communication system, comprising:
a transmitter configured to transmit a data signal;
a communication channel having a jitter characteristic, and being configured to transmit the data signal under the jitter characteristic; and
a receiver configured to receive the data signal, and recover data from the data signal, wherein the receiver further comprises:
a clock generator module configured to generate a clock signal for data sampling;
a phase adjustor module configured to provide a sampling clock based on the clock signal and a phase directive;
a sampler module configured to sample the received data signal according to the sampling clock; and
a reduced angle phase comparator unit configured to detect a phase of a data transition within a full unit interval that is divided into an active zone including a phase of the sampling clock and an inactive zone outside of the active zone, the reduced angle phase comparator further configured to generate the phase directive and provide the phase directive to the phase adjustor module when the phase of the data transition is within the active zone but not to generate the phase directive when the phase of the data transition is within the inactive zone.

* * * * *

UNITED STATES PATENT AND TRADEMARK OFFICE
CERTIFICATE OF CORRECTION

| | | |
|---|---|---|
| PATENT NO. | : 8,396,180 B2 | Page 1 of 1 |
| APPLICATION NO. | : 12/314897 | |
| DATED | : March 12, 2013 | |
| INVENTOR(S) | : Jerome J. Ribo | |

It is certified that error appears in the above-identified patent and that said Letters Patent is hereby corrected as shown below:

Title Page:

Please amend the Assignee as follows:

Item (73), please change "Assignee: Kawasaki Microelectronics America Inc., San Jose" to --Assignee: Kawasaki Microelectronics, Inc., Chiba, JP--

Signed and Sealed this
Thirteenth Day of August, 2013

Teresa Stanek Rea
*Acting Director of the United States Patent and Trademark Office*